(12) United States Patent
McDowell et al.

(10) Patent No.: US 10,024,075 B2
(45) Date of Patent: Jul. 17, 2018

(54) APPARATUS, SYSTEM AND METHODS FOR SUPPORTING ONE OR MORE UPRIGHT ITEMS FROM A SUPPORT SURFACE

(71) Applicant: NEWPARK MATS & INTEGRATED SERVICES LLC, The Woodlands, TX (US)

(72) Inventors: James Kerwin McDowell, Lafayette, LA (US); Donald Scott Rogers, Lafayette, LA (US); Grant Steven Cavalier, Lafayette, LA (US); Billy James McDonald, Lafayette, LA (US)

(73) Assignee: Newpark Mats & Integrated Services LLC, The Woodlands, TX (US)

( * ) Notice: Subject to any disclaimer, the term of this patent is extended or adjusted under 35 U.S.C. 154(b) by 0 days.

(21) Appl. No.: 15/132,410

(22) Filed: Apr. 19, 2016

(65) Prior Publication Data

US 2016/0312490 A1   Oct. 27, 2016

Related U.S. Application Data

(60) Provisional application No. 62/151,817, filed on Apr. 23, 2015.

(51) Int. Cl.
  *E04H 12/22* (2006.01)
  *E04F 11/18* (2006.01)
  *F16B 9/02* (2006.01)
  *E04F 15/10* (2006.01)

(52) U.S. Cl.
  CPC ...... *E04H 12/2269* (2013.01); *E04F 11/1812* (2013.01); *E04F 11/1865* (2013.01); *E04F 15/105* (2013.01); *F16B 9/023* (2013.01); *E04F 2201/0505* (2013.01); *E04F 2203/065* (2013.01)

(58) Field of Classification Search
  CPC ............. E04H 12/2238; E04H 12/2269; E04F 11/1812; E04F 11/1865; E04F 11/1814; E04F 15/105; F16B 9/023; F16B 21/02; F16B 7/0413; F16B 7/18; F16B 9/026; E01C 5/005
  See application file for complete search history.

(56) References Cited

U.S. PATENT DOCUMENTS 3,383,975 A * 5/1968 Cushman ................ F16B 9/026
                                                                411/92
3,407,454 A * 10/1968 Myatt .................... B64D 29/06
                                                                411/549
(Continued)

FOREIGN PATENT DOCUMENTS

JP      05156790 A    6/1993
JP      07062892 A    3/1995
(Continued)

*Primary Examiner* — Charles A Fox
*Assistant Examiner* — Charissa Ahmad
(74) *Attorney, Agent, or Firm* — E. Randall Smith; E. Randall Smith, P.C.

(57) ABSTRACT

System for supporting an upright member from a support surface includes an elongated carrier releasably engageable with the support surface, a base adapted to extend around at least part of the lower end of the carrier and abut the support surface and at least one anchor associated with the carrier and configured to grip the upright member when the upright member is inserted into a bore of the carrier.

26 Claims, 10 Drawing Sheets

(56) References Cited

U.S. PATENT DOCUMENTS

| | | | | |
|---|---|---|---|---|
| 4,047,266 A * | 9/1977 | Bisbing | F16B 21/04 | 411/349 |
| 4,176,428 A * | 12/1979 | Kimura | B60R 13/0206 | 24/297 |
| 4,240,766 A * | 12/1980 | Smith | E01F 9/677 | 248/160 |
| 4,248,131 A * | 2/1981 | Larro | F16B 21/06 | 285/140.1 |
| 4,412,407 A * | 11/1983 | Melfi | E04F 11/1812 | 52/309.1 |
| 4,522,530 A * | 6/1985 | Arthur | E02D 5/80 | 40/608 |
| 4,667,916 A * | 5/1987 | Richards | F16B 7/0413 | 248/343 |
| 4,668,145 A * | 5/1987 | Hirohata | F16B 5/065 | 411/45 |
| 4,691,889 A * | 9/1987 | Richards | F16B 7/0413 | 16/38 |
| 4,739,126 A * | 4/1988 | Gutter | H02G 3/065 | 174/655 |
| 4,890,954 A * | 1/1990 | Richards | F16B 7/0413 | 248/343 |
| 4,893,426 A * | 1/1990 | Bixler | F16B 7/20 | 403/299 |
| 5,068,496 A * | 11/1991 | Favalora | F16L 5/06 | 174/654 |
| 5,197,819 A * | 3/1993 | Hughes | E01F 9/692 | 116/63 R |
| 5,323,557 A * | 6/1994 | Sonntag | E01F 15/0469 | 47/32 |
| 6,062,162 A * | 5/2000 | Dean | E01F 9/629 | 116/173 |
| 6,264,393 B1 * | 7/2001 | Kraus | B60R 13/0206 | 24/297 |
| 6,357,090 B1 * | 3/2002 | Murai | A44B 99/005 | 24/590.1 |
| 6,357,958 B1 * | 3/2002 | Geib | F16B 2/065 | 403/11 |
| 6,581,344 B1 * | 6/2003 | Niewiadomski | E04B 2/7425 | 160/369 |
| 6,722,831 B2 * | 4/2004 | Rogers | F16B 21/02 | 411/345 |
| 6,890,006 B2 * | 5/2005 | Crestin | H02G 15/04 | 285/243 |
| 7,784,761 B2 * | 8/2010 | Ma | E04H 12/2238 | 135/16 |
| 7,819,605 B2 * | 10/2010 | Heald | E04H 12/2269 | 116/63 R |
| 7,930,859 B1 * | 4/2011 | Eslambolchi | E04H 12/2269 | 248/159 |
| 7,963,567 B2 * | 6/2011 | Gallardo | F16L 5/08 | 285/139.1 |
| 8,196,872 B1 * | 6/2012 | McGrath | F16B 9/023 | 248/346.01 |
| 8,388,291 B2 * | 3/2013 | Rogers | F16B 21/02 | 24/453 |
| 8,572,818 B2 * | 11/2013 | Hofmann | B60R 13/0206 | 24/297 |
| 8,936,374 B1 * | 1/2015 | Royse | F21V 33/006 | 362/153 |
| 2004/0005430 A1 * | 1/2004 | Rogers | B32B 3/02 | 428/44 |
| 2007/0209816 A1 * | 9/2007 | Pourtier | B25B 31/00 | 173/93.5 |
| 2008/0201920 A1 * | 8/2008 | Jatzke | B60R 11/00 | 24/458 |
| 2008/0295375 A1 * | 12/2008 | Intagliata | E01F 9/629 | 40/608 |
| 2010/0281791 A1 * | 11/2010 | Intagliata | E04H 12/2261 | 52/127.12 |
| 2011/0277401 A1 * | 11/2011 | Mathiowetz | F16B 5/0258 | 52/173.3 |
| 2011/0290171 A1 | 12/2011 | Brick et al. | | |
| 2014/0079478 A1 * | 3/2014 | Kagaya | F16B 7/18 | 403/343 |
| 2014/0137505 A1 * | 5/2014 | Jean | E04B 5/023 | 52/588.1 |

FOREIGN PATENT DOCUMENTS

| | | |
|---|---|---|
| JP | 2002322815 A | 11/2002 |
| JP | 2006118223 A | 5/2006 |

\* cited by examiner

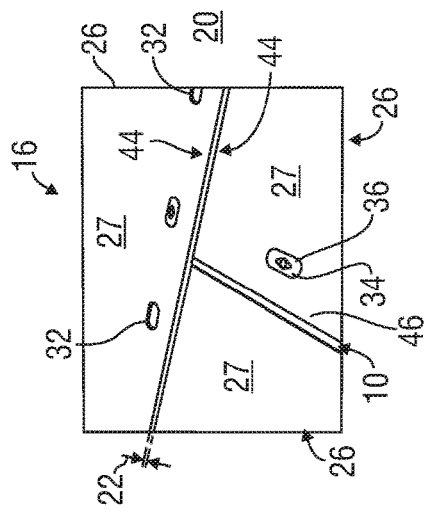
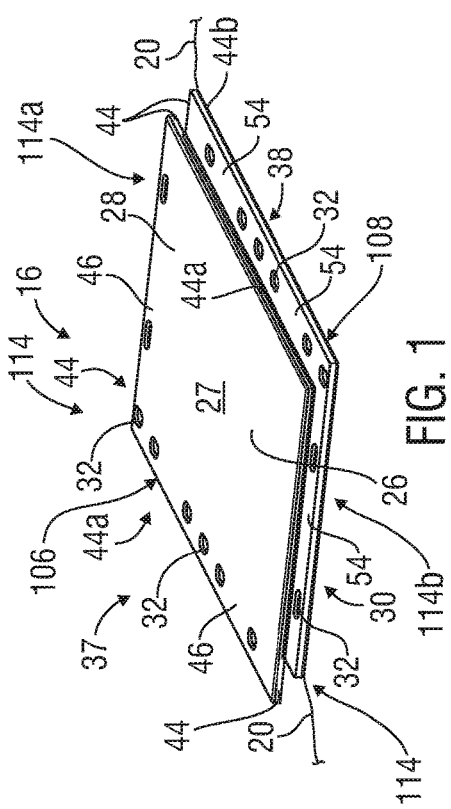
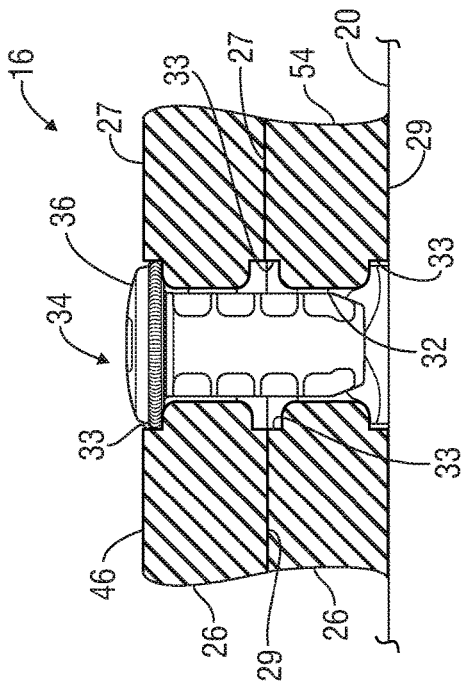
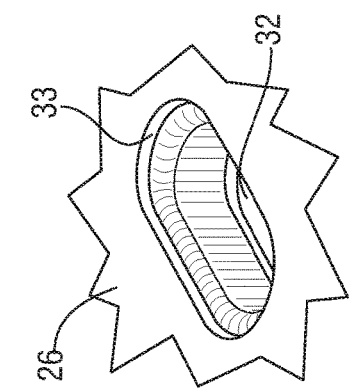

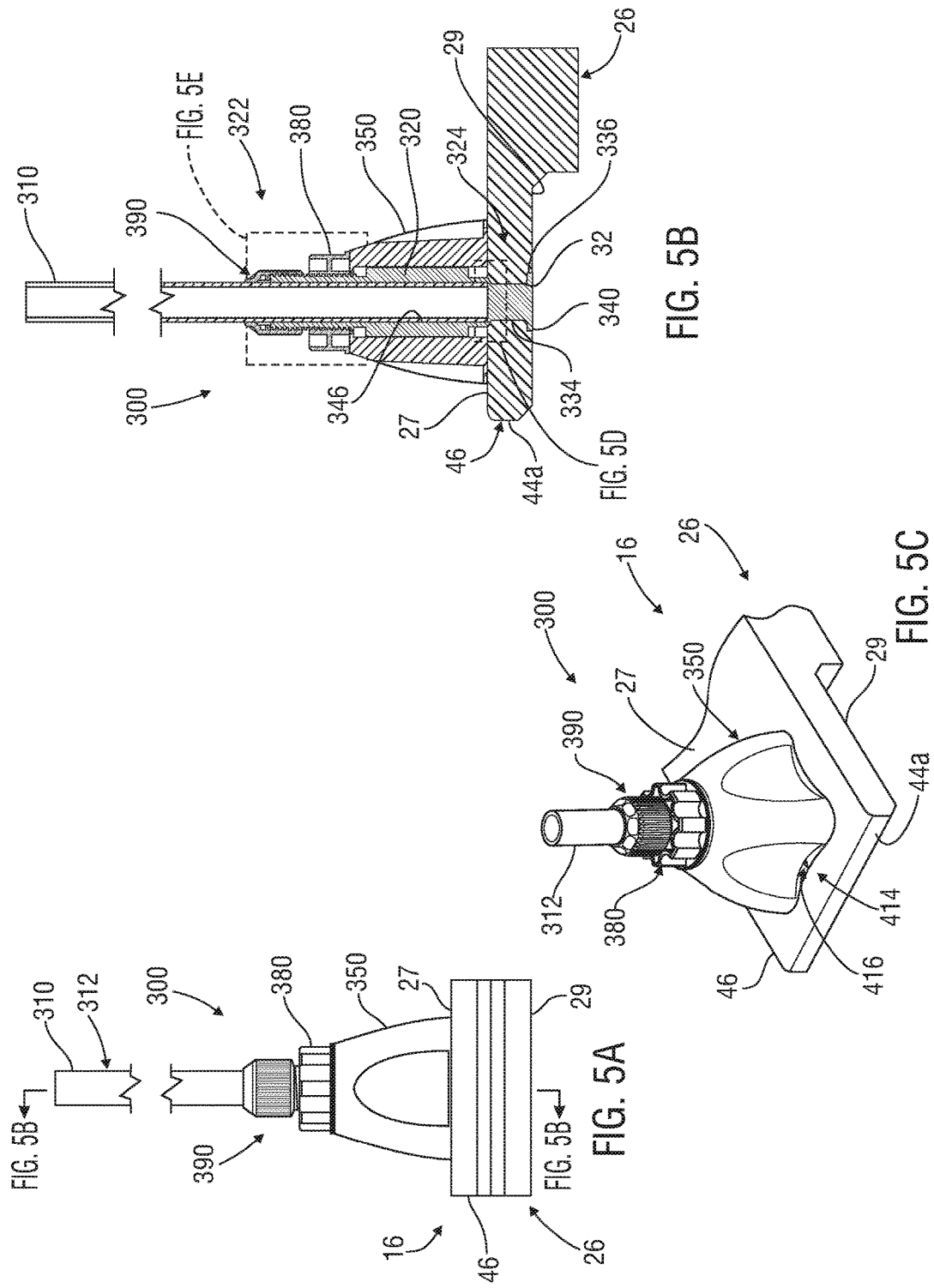

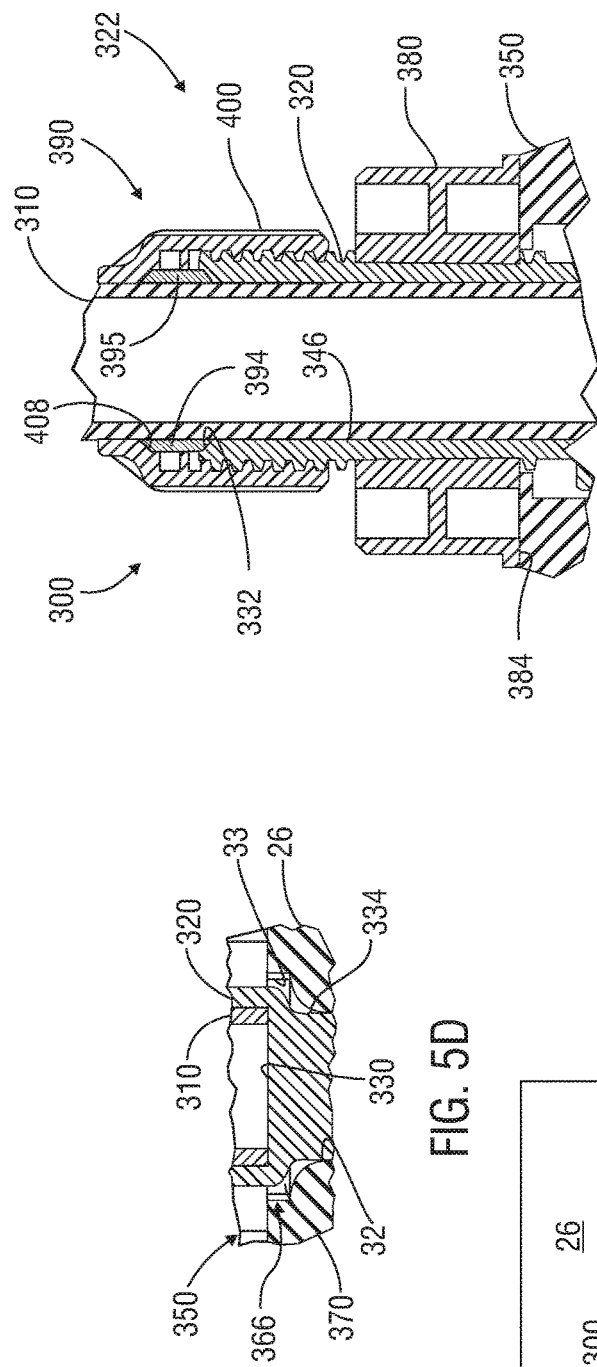
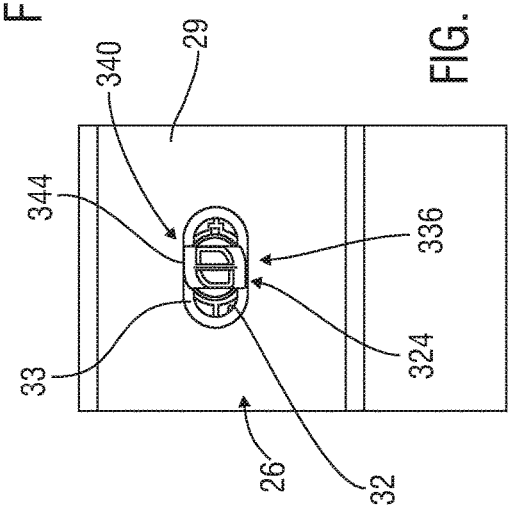
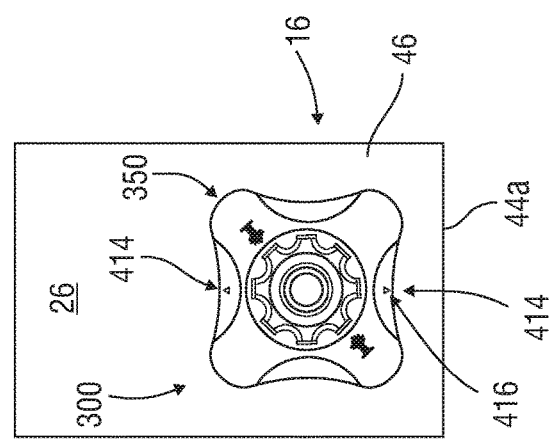
FIG. 5E
FIG. 5G
FIG. 5D
FIG. 5F

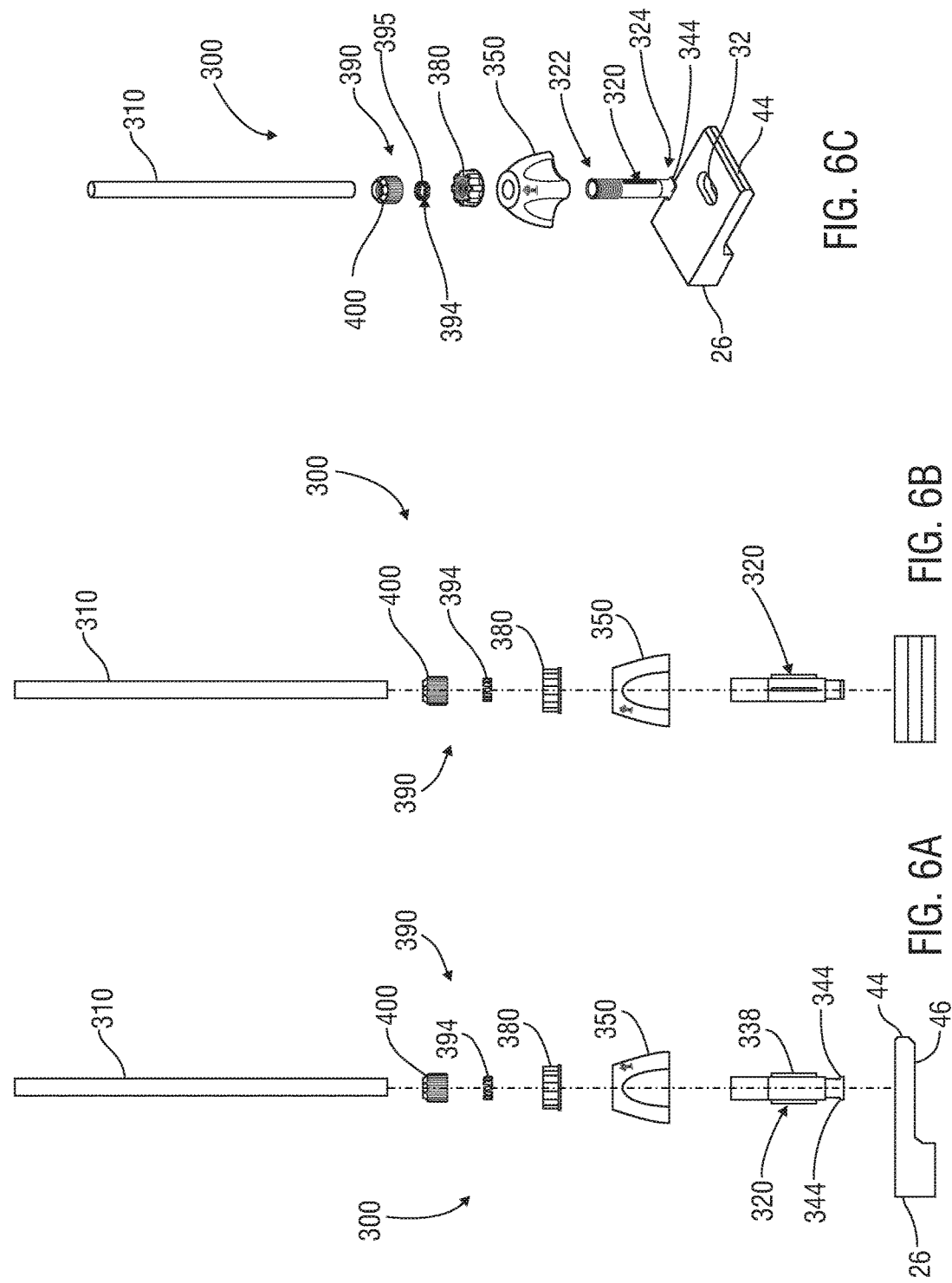

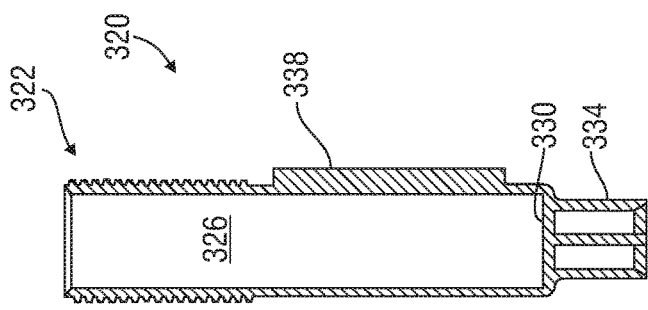
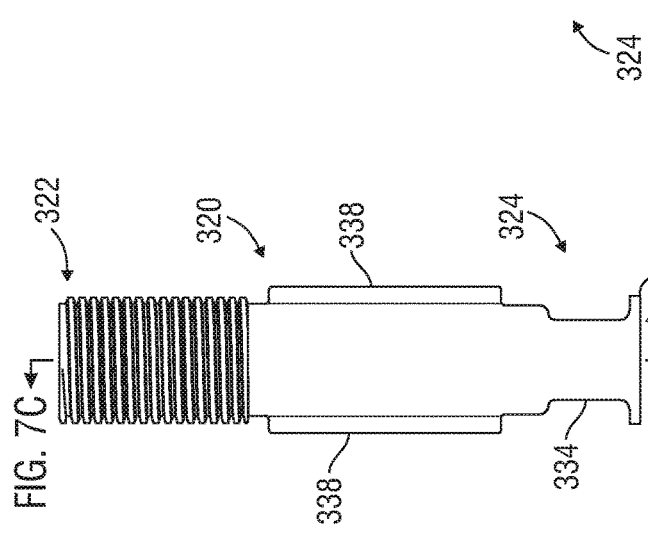
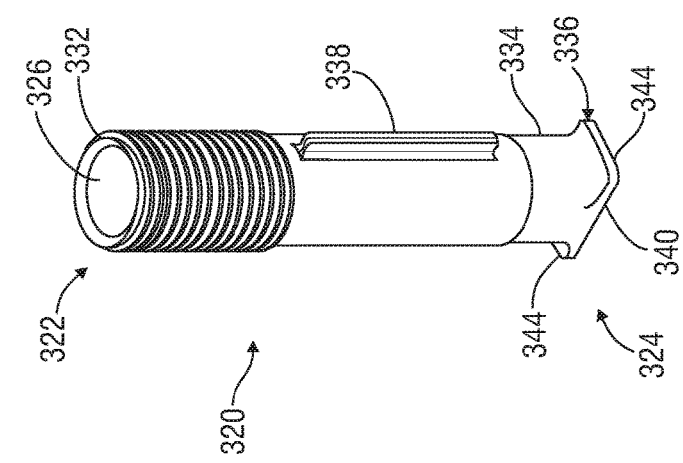
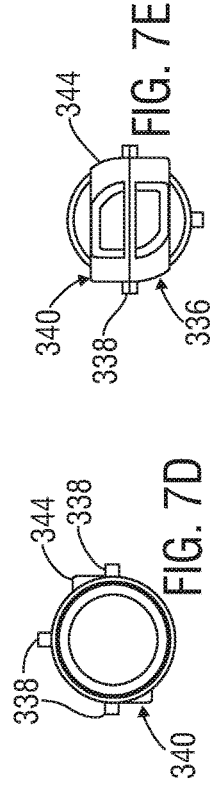

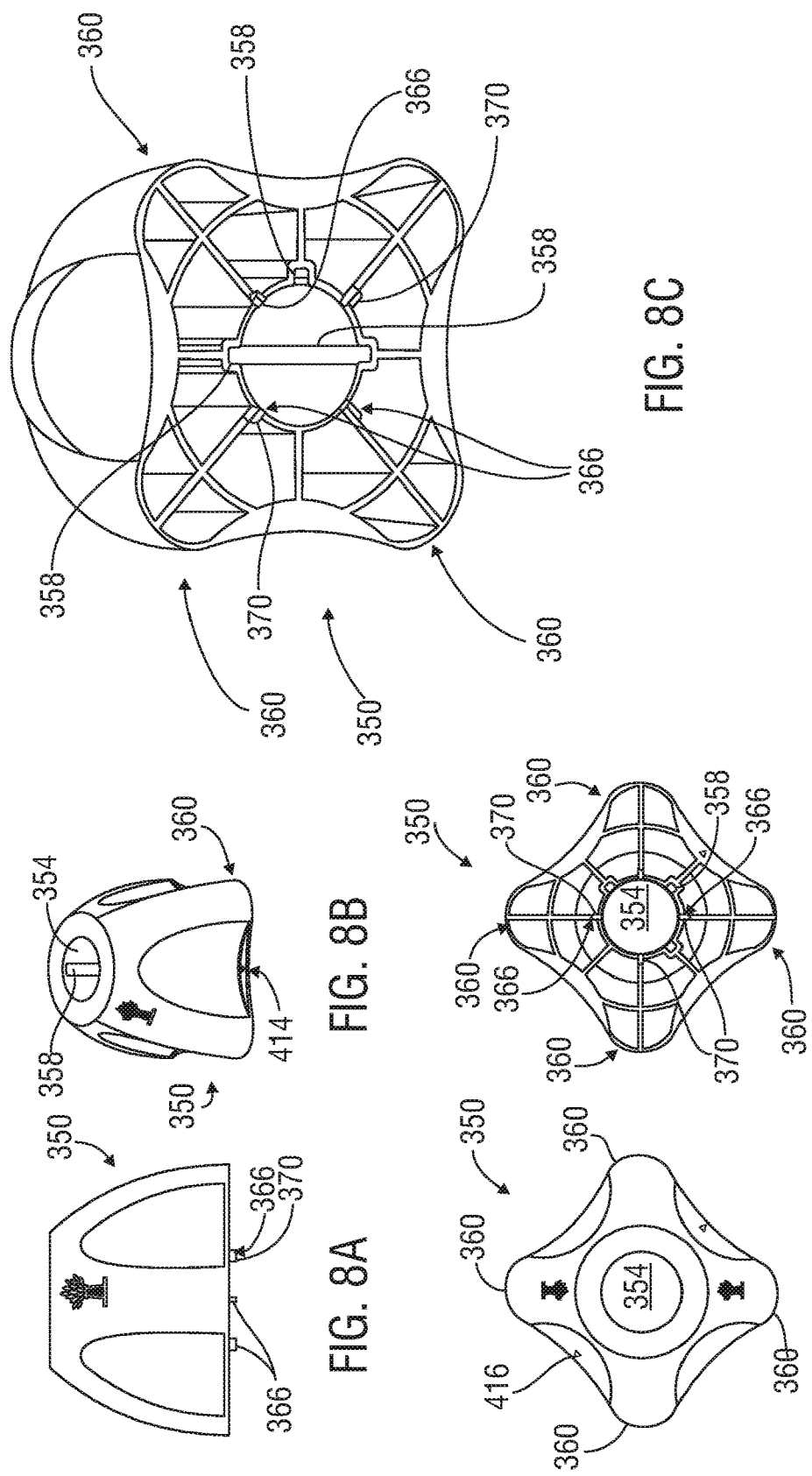

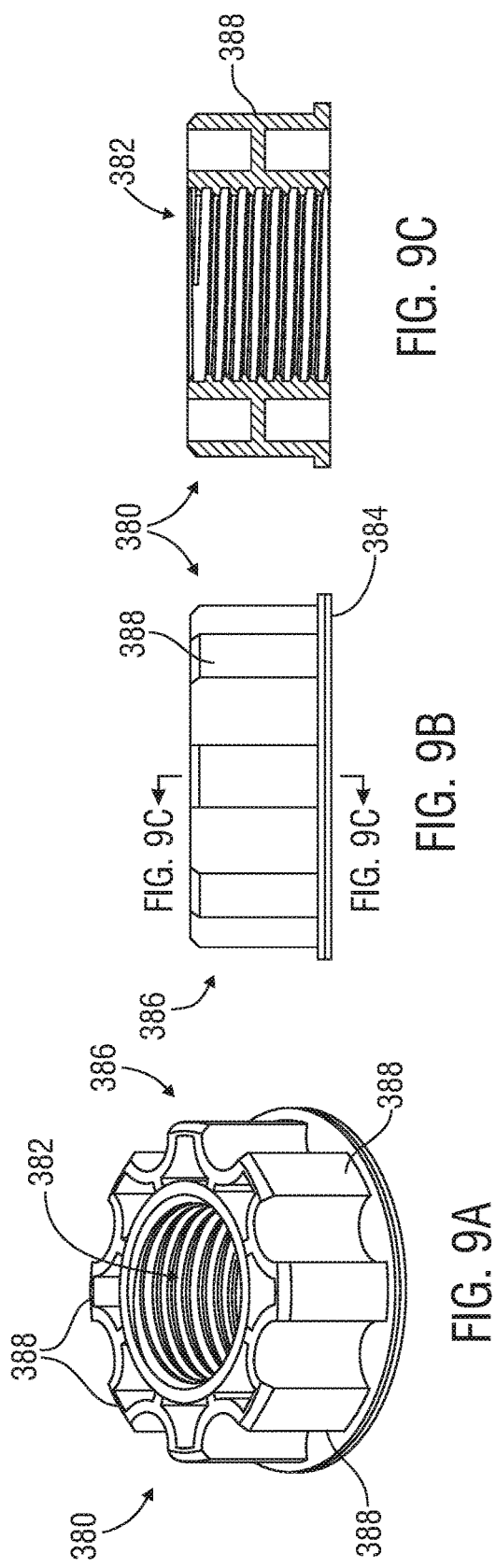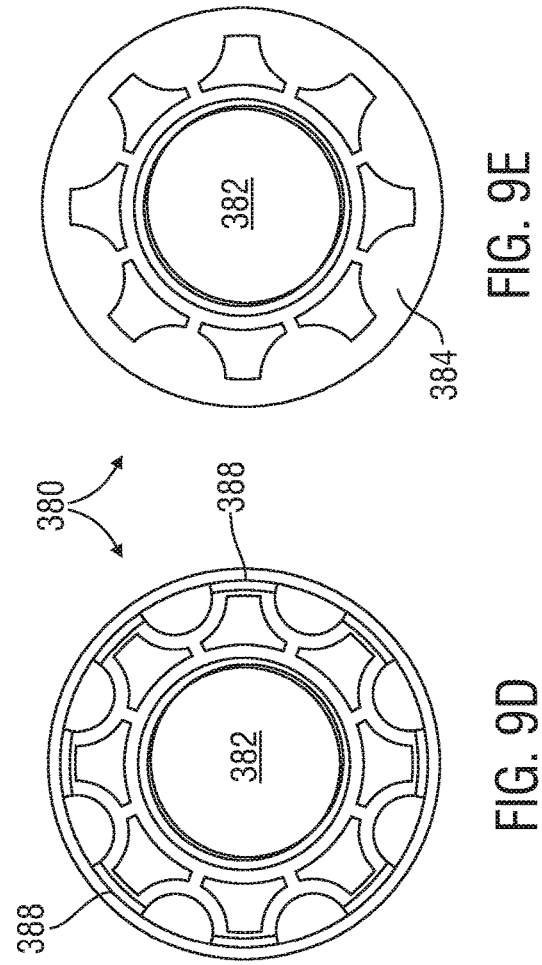

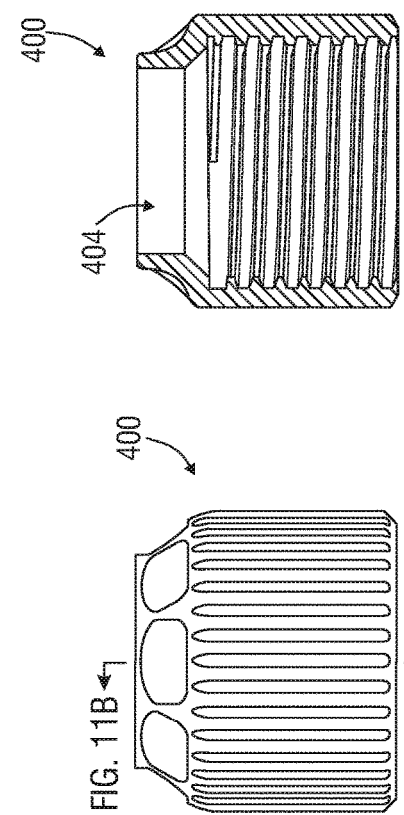
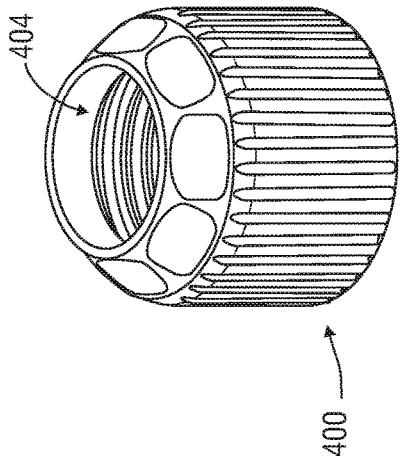
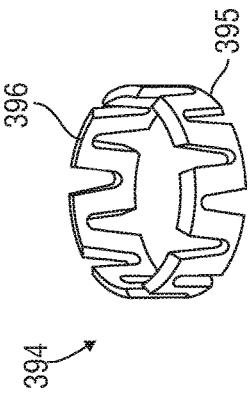
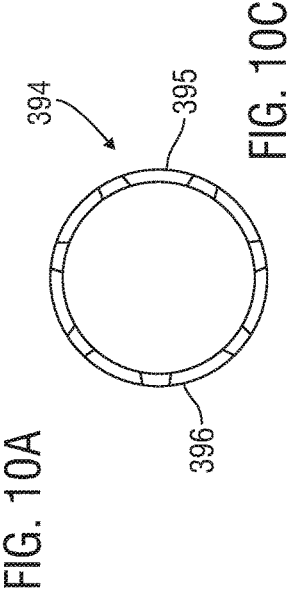
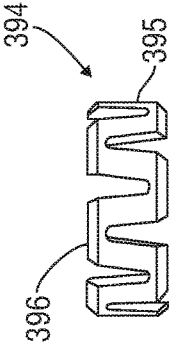
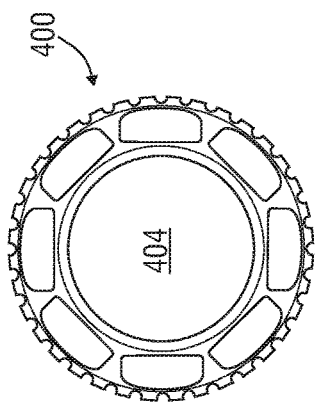

APPARATUS, SYSTEM AND METHODS FOR SUPPORTING ONE OR MORE UPRIGHT ITEMS FROM A SUPPORT SURFACE

The present application claims priority to U.S. Provisional Patent Application Ser. No. 62/151,817, filed on Apr. 23, 2015 and entitled "Apparatus, System and Methods for Supporting One or More Upright Items From a Support Surfaces", which is hereby incorporated by reference herein in its entirety.

FIELD OF THE DISCLOSURE

The present disclosure relates generally to supporting one or more upright items from a support surface.

BACKGROUND

Temporary or semi-permanent support surfaces and other components have been used for roadways, remote jobsites, industrial staging areas and the like in an ever-increasing myriad of industries, such as the construction, military, oilfield, transportation, disaster response, utilities and entertainment industries. It is sometimes necessary or desirable to provide one or more upright items in connection with the support surface. A few examples of upright items that, depending upon the particular scenario and application, may be used in connection with support surfaces are signs, fences, safety barriers, markers, road reflectors, warning sirens, beacons or other lights or other accessories, or a combination thereof. As used herein, the terms "upright member" and variations thereof mean any item or combination of items desired to be visible or audible from a particular location on a support surface.

In some applications and use scenarios, the upright item should be able to withstand some amount of forces applied to them. For example, in some instances, the forces may be wind forces. For another example, the forces may be leaning loads, such as the forces of personnel leaning on a safety barrier. If desired, the upright item may be designed to satisfy regulatory or other load-bearing standards or requirements, such as OSHA's proscribed load target(s) for supporting leaning loads. Thus, there is a need for improved apparatus, systems and methods for supporting upright items from a support surface.

It should be understood that the above-described features and capabilities are provided for illustrative purposes only and are not intended to limit the scope or subject matter of the appended claims or those of any related patent application or patent. Thus, none of the appended claims or claims of any related application or patent should be limited by the above discussion or construed to address, include or exclude each or any of the above-cited features or capabilities merely because of the mention thereof herein.

Accordingly, there exists a need for improved systems, articles and methods for supporting one or more upright items from a support surface having one or more of the attributes or capabilities described or shown in, or as may be apparent from, the other portions of this disclosure.

BRIEF SUMMARY OF THE DISCLOSURE

In some embodiments, the present disclosure involves a system for supporting at least one upright member from a support surface. The system of these embodiments includes at least one elongated carrier having upper and lower ends. A foot disposed at the lower end of the carrier is at least partially insertable into at least one hole of the support surface and releasably engageable therewith. The carrier also includes a longitudinally-oriented bore extending at least partially therethrough, accessible through the upper end thereof and configured to receive at least part of the upright member(s). At least one base is arranged and adapted to extend around at least part of the lower end of the carrier and abut the top side of the support surface. At least one anchor is associated with the carrier and adapted to grip the upright member when the upright member is inserted into the bore of the carrier.

In many embodiments, the present disclosure involves methods of supporting at least one upright member from a support surface with the use of the upright member support system of Paragraph 0007 above. The support surface has a top side, bottom side and at least one hole extending therethrough. These methods include positioning a rotatable foot disposed at the lower end of an elongated carrier in at least a first position. The lower end of the carrier is inserted into the hole(s) of the support surface from above the top side thereof so that the foot is positioned below the bottom side of the support surface. The foot of the carrier is rotated into at least a second position so that at least one toe extending outwardly from the foot abuts the bottom side of the support surface. The base is positioned at least partially around the carrier so it at least partially covers at least part of the lower end of the carrier. The upright member is inserted into a longitudinally-oriented bore of the carrier. The anchor is releasably secured to the carrier and releasably grips the upright member.

The present disclose includes embodiments of systems for supporting at least one upright member from a support surface having a top side, bottom side and at least one hole extending therethrough. These systems include an elongated carrier having upper and lower ends. The lower end of the carrier including a rotatable foot insertable through and removable from the hole(s) of the support surface from above the top side thereof when the foot is rotated in at least a first position. The foot includes at least one toe extending outwardly therefrom and releasably engageable with the bottom side of the support surface when the foot is rotated into at least a second position (after being inserted through the hole(s) of the support surface). The carrier also includes a longitudinally-oriented bore extending at least partially therethrough, accessible at the upper end thereof and configured to receive at least part of the upright member(s). The base is arranged and adapted to extend around at least part of the lower end of the carrier and configured to abut the top side of the support surface. At least one releasable lock is engageable with the carrier above the base and configured to assist in securing the base in abutting contact with the top side of the support surface.

In various embodiments, the present disclosure involves a method of supporting at least one upright member from a reusable support surface with the use of an upright member support system that includes at least one elongated carrier, base, lock and anchor. The support surface includes at least one mat. The method includes inserting at least part of the lower end of the elongated carrier into a hole in at least one of the mats and releasably securing the carrier to the mat(s). The base is slid over and down the carrier so it covers at least part of the lower end of the carrier and abuts the mat(s). The lock is threadably engaged onto a threaded upper end of the carrier above the base. The lock is tightened down relative to the carrier and base sufficient to secure the base into abutting contact with the mat. The upright member is inserted into a longitudinally-oriented bore of the carrier.

The anchor is releasably secured to the carrier above the lock and grips the upright member.

Accordingly, the present disclosure includes features and advantages which are believed to enable it to advance the art of supporting one or more upright items from a support surface. Characteristics and advantages of the present disclosure described above and additional features and benefits will be readily apparent to those skilled in the art upon consideration of the following detailed description of various embodiments, the accompanying drawings and appended claims.

BRIEF DESCRIPTION OF THE DRAWINGS

The following figures are part of the present specification, included to demonstrate certain aspects of various embodiments of this disclosure and referenced in the detailed description herein:

FIG. 1 is a perspective view of an exemplary mat useful in a support surface in accordance with an embodiment of the present disclosure;

FIG. 2 is a top view of a portion of an exemplary support surface useful in accordance with an embodiment of the present disclosure;

FIG. 3A is a perspective view of an exemplary hole in an exemplary mat;

FIG. 3B is a partial cross-sectional view of an exemplary locking pin shown engaged with two mats;

FIG. 5A is a front view of an exemplary upright member support system in accordance with an embodiment of the present disclosure;

FIG. 5B is a cross-sectional view of the exemplary upright member support system shown in FIG. 5A taken along line 5B-5B;

FIG. 5C is a perspective view of the exemplary upright member support system shown in FIG. 5A;

FIG. 5D is an exploded cross-sectional view of part of the exemplary upright member support system shown in FIG. 5B;

FIG. 5E is an exploded cross-sectional view of part of the exemplary upright member support system shown in FIG. 5B;

FIG. 5F is a top view of the exemplary upright member support system shown in FIG. 5B;

FIG. 5G is a bottom view of the exemplary upright member support system shown in FIG. 5B;

FIG. 6A is an assembly view of an exemplary upright member support system in accordance with an embodiment of the present disclosure;

FIG. 6B is a side view of the exemplary upright member support system depicted in FIG. 6A;

FIG. 6C is a perspective view of the exemplary upright member support system depicted in FIG. 6A;

FIG. 7A is a perspective view of an exemplary carrier useful in an exemplary upright member support system in accordance with an embodiment of the present disclosure;

FIG. 7B is a side view of the exemplary carrier shown in FIG. 7A;

FIG. 7C is a cross-sectional view of the exemplary carrier depicted in FIG. 7B taken along lines 7C-7C;

FIG. 7D is a top view of the exemplary carrier shown in FIG. 7A;

FIG. 7E is a bottom view of the exemplary carrier shown in FIG. 7A;

FIG. 8A is a side view of an exemplary base useful in an exemplary upright member support system in accordance with an embodiment of the present disclosure;

FIG. 8B is a perspective view of the exemplary base depicted in FIG. 8A;

FIG. 8C is another perspective view of the exemplary base depicted in FIG. 8A showing the bottom of the exemplary base;

FIG. 8D is a top view of the exemplary base depicted in FIG. 8A;

FIG. 8E is a bottom view of the exemplary base depicted in FIG. 8A;

FIG. 9A is a perspective view of an exemplary lock useful in an exemplary upright member support system in accordance with an embodiment of the present disclosure;

FIG. 9B is a side view of the exemplary lock depicted in FIG. 9A;

FIG. 9C is a cross-sectional view of the exemplary lock depicted in FIG. 9B taken along lines 9C-9C;

FIG. 9D is a top view of the exemplary lock depicted in FIG. 9A;

FIG. 9E is a bottom view of the exemplary lock depicted in FIG. 9A;

FIG. 10A is a side view of an exemplary compression member useful as part of an embodiment of an anchor of an exemplary upright member support system in accordance with an embodiment of the present disclosure;

FIG. 10B is a perspective view of the exemplary compression member shown in FIG. 10A;

FIG. 10C is a top view of the exemplary compression member shown in FIG. 10A;

FIG. 11A is a side view of an exemplary compression nut useful as part of an embodiment of an anchor of an exemplary upright member support system in accordance with an embodiment of the present disclosure;

FIG. 11B is a cross-sectional view of the exemplary compression nut shown in FIG. 11A taken along lines 11B-11B;

FIG. 11C is a perspective view of the exemplary compression nut shown in FIG. 11A;

FIG. 11D is a top view of the exemplary compression nut shown in FIG. 11A;

DETAILED DESCRIPTION OF PREFERRED EMBODIMENTS

Figure 4A:
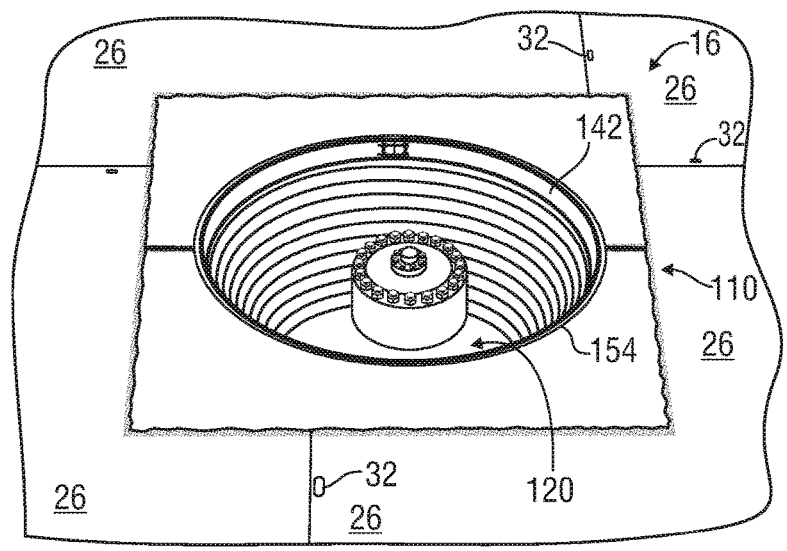
FIG. 4A is a perspective view of a borehole equipped with an embodiment of a borehole edge seal system.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent application or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms "invention", "present invention" and variations thereof are not intended to mean every possible embodiment encompassed by this disclosure or any particular claim(s). Thus, the subject matter of each such reference should not be considered as necessary for, or part of, every embodiment hereof, or of any particular claim(s) merely because of such reference. The terms "coupled", "connected", "engaged" and the like, and variations thereof, as used herein and in the appended claims are intended to mean either an indirect or direct connection or engagement. Thus, if a first device couples to a second device, that connection may be through a direct connection, or through an indirect connection via one or more other devices and/or connections.

Certain terms are used herein and in the appended claims to refer to particular components. As one skilled in the art will appreciate, different persons may refer to a component by different names. The use of a particular or known term of art as the name of a component herein is not intended to limit that component to only the known or defined meaning of such term (e.g. nut). Further, this document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

As used herein, the terms "substantially", "generally" and variations thereof means and includes (i) completely, or 100%, of the referenced parameter, variable or value and (ii) a range of values less than 100% based upon the typical, normal or expected degree of variation or error for the referenced parameter, variable or value in the context of the particular embodiment or use thereof, such as, for example, 90-100%, 95-100% or 98-100%. However, in some instances of the use of the terms "generally", "substantially" and variations thereof herein, the above definition may not apply, as should be apparent from the context of such use.

Referring initially to FIGS. 1 and 2, an exemplary support surface 16 having at least one panel or mat 26 deployed on or near the ground 20 is shown. As used herein, the term "ground" and variations thereof mean the earth's surface, and/or other one or more other surfaces, structures or areas proximate to or associated with the earth's surface. In the present embodiment, the support surface 16 is reusable and capable of supporting the weight of people, vehicles, equipment and/or other structures thereupon. The illustrated support surface 16 includes at least two interconnected adjacent mats 26.

The mats 26 may have any suitable form, construction, components, configuration and operation. Some examples of mats 26 which may be used in various embodiments of the present disclosure are shown and described in in U.S. Pat. No. 5,653,551 to Seaux, entitled "Mat System for Construction of Roadways and Support Surfaces" and issued on Aug. 5, 1997, and U.S. Pat. No. 6,511,257 to Seaux et al., entitled "Interlocking Mat System for Construction of Load Supporting Surfaces" and issued on Jan. 28, 2003, both of which have a common Assignee as the present patent application and the entire contents of which are hereby incorporated by reference herein in their entireties. For example, each exemplary mat 26 may weigh approximately 1,000 lbs., be designed to withstand up to 600 psi in pure crush pressure placed thereupon, reduce point-to-point ground pressure on the ground 20 that may be caused by wheeled and/or tracked vehicles on the mat 26 or a combination thereof. In some embodiments, the mats 26 may be 14'×8' DURA-BASE® mats currently sold by the Assignee of this patent application. As used herein and in the appended claims, the term "mat" and variations thereof includes and incorporates a mat, panel or other component of a support surface.

If desired, the support surface 16 may be used in connection with any of the components and features described and shown in U.S. Pat. No. 9,132,996 issued on Sep. 15, 2015 to Robertson and entitled "Crane-Mounted Grab Head", U.S. Pat. No. 9,297,124 issued on Mar. 29, 2016 and entitled "Methods of Moving at Least One Mat With a Crane-Mounted Grab Head", U.S. Pat. No. 7,370,452 issued on May 13, 2008 to Rogers and entitled "Mat Assembly for Heavy Equipment Transit and Support", U.S. Pat. No. 9,039,325 issued on May 26, 2015 to McDowell and entitled "Liquid Containment System for Use with Load-Supporting Surfaces", U.S. patent application Ser. No. 14/720,799, filed on May 24, 2015 and entitled "Liquid Containment System", U.S. patent application Ser. No. 14/336,163, filed on Jul. 21, 2014 and entitled "Apparatus and Methods for Providing Illuminated Signals from a Load-Supporting Surface", U.S. patent application Ser. No. 14/496,105, filed on Sep. 25, 2014 and entitled "Apparatus & Methods for Electrically Grounding a Load-Supporting Surface", and U.S. patent application Ser. No. 14/838,064, filed on Aug. 27, 2015 and entitled "Apparatus & Methods for Electrically Grounding a Load-Supporting Surface", each of which has a common Assignee as the present patent application and the entire contents of which are hereby incorporated by reference herein in their entireties.

Still referring to FIGS. 1 and 2, in the illustrated embodiment, each mat 26 is flat, or planar, heavy duty, durable and all-weather. The exemplary mats 26 are reusable and interlock together to form at least part of the support surface 16. Each illustrated mat 26 has a stepped-configuration and is constructed of impermeable material, such as thermoplastic. As used herein, the terms "stepped-configuration" and variations thereof mean the mat 26 has at least one portion that extends at least partially on a different plane than at least one other portion and the planes are at least substantially parallel. Other example mats 26 may be constructed entirely or partially of wood, steel, steel-framed wood, aluminum, rubber, plastic, fiberglass, fiber reinforced plastic, recycled rubber or materials or any other desired material or combination thereof.

Referring specifically to FIG. 1, the illustrated mat 26 has a rectangular shape with an opposing pair of short sides 28, 30, an opposing pair of long sides 37, 38, and at least one edge 44 (e.g. edge 44a) extending along each side 28, 30, 37 and 38 and around a perimeter 114 (e.g. perimeter 114a) of the mat 26. In this particular example, the mat 26 is constructed of upper and lower engaged offset panels 106, 108 and is reversible. In other words, the top and bottom of the illustrated mat 26 are mirror images of one another, so either the top or bottom can be facing up or down and interconnected with other mats or other components of a support surface 16. The illustrated mat 26 thus has a first, upper, set of aligned edges 44a extending around an "upper" perimeter 114a (formed around the upper panel 106), and a second, lower, set of aligned edges 44b extending around a "lower" perimeter 114b (formed around the lower panel 108). However, in other embodiments, the mat 26 may be a single unitary item or a combination of more than two component parts, may not be reversible, may have only one, or more than two, perimeters 114, or any desired combination thereof.

In this example, the first short side 28 and first long side 37 each have an upper lip 46 extending horizontally outwardly therefrom, which will typically be spaced above the ground 20. The illustrated second short side 30 and second long side 38 each have a lower lip 54 extending horizontally outwardly therefrom, and which will typically rest on the ground 20. Thus, in this embodiment, two sets of aligned edges 44a, 44b are formed around the sides 28, 30, 37 and 38.

The upper and lower lips 46, 54 may have any suitable size, shape, configuration and length. It should be understood, however, that the present disclosure is not limited to use with the above-described embodiments of mats 26 having upper and/or lower lips 46, 54 or a stepped-configuration. For example, the embodiments of an upright member support system 300 as described below may be used in connection with mats 26 not having upper and/or lower lips 46, 54 or a stepped-configuration.

Referring back to FIGS. 1 & 2, many temporary or semi-permanent support surfaces have holes, or cut-outs, 32 formed in them. For example, support surfaces 16 made up of multiple mats, panels and/or other components often include connecting holes 32 formed therein. In some instances, the mats, panels and/or other components include holes 32 that can be aligned over or under those of adjacent mats/panels/components and through which removable locking pins 34 are inserted for connecting the mats/components together. These sorts of holes 32 are sometimes referred to herein as "locking pin" holes.

In the illustrated example, the respective upper and lower lips 46, 54 of different mats 26 are interconnectable with locking pins 34 releasably securable through corresponding locking pin holes 32 formed therein. The locking pin holes 32 and locking pins 34 may have any suitable form, construction, configuration, components and operation. In this embodiment, the illustrated mats 26 include a plurality of locking pin holes 32, each configured to accept a releasable locking pin 34 therethrough. Each illustrated mat 26 may include, for example, a total of sixteen locking pin holes 32, eight locking pin holes 32 formed in each set of upper and lower lips 46, 54. However, the present disclosure is not limited to use with mats or other support surface components having "locking pin" holes, but can be used with mats or other support surface components having any suitable orifice, opening, hole or cut-out formed therein. Thus, as used herein, the terms "hole" and variations thereof mean any hole, opening, orifice or cut-out formed in a mat, panel or other component of a support surface, having any desired shape, location, configuration and form and suitable for use in connection with an upright member support system in accordance with the present disclosure.

Some examples of locking pins 34 which may be used in various embodiments of the present disclosure are shown and described in U.S. Pat. No. 6,722,831 to Rogers et al., entitled "Fastening Device" and issued on Apr. 20, 2004, U.S. Pat. No. 8,388,291 to Rogers, entitled "Mat Lock Pin" and issued on Mar. 5, 2013, U.S. Pat. No. 9,068,584 to McDowell et al, entitled and "Apparatus & Methods for Connecting Mats" and issued on Jun. 30, 2015, U.S. Provisional Patent Application Ser. No. 62/216,542, entitled "Apparatus for Connecting Mats and/or Other Components and Methods of Assembly and Use Thereof" and filed on Sep. 10, 2015, each of which has a common Assignee as the present patent application and the entire contents of which are hereby incorporated by reference herein in its entirety.

In some embodiments, the locking pins 34 may form a fluid-tight seal around, or in, the locking pin holes 32 within which they are engaged, such as the exemplary locking pin 34 illustrated and described in U.S. Pat. No. 9,068,584, U.S. Provisional Patent Application Ser. No. 62/216,542, entitled "Apparatus for Connecting Mats and/or Other Components and Methods of Assembly and Use Thereof" and filed on Sep. 10, 2015 and U.S. patent application Ser. No. 14/752, 067 entitled "Adjustable Mat Locking Pin and Methods of Use Thereof" and filed on Jun. 26, 2015, all of which have a common Assignee as the present patent application and the entire contents of which are hereby incorporated by reference herein in their entireties.

Referring to FIGS. 3A & 3B, the illustrated locking pin holes 32 of the mats 26 have a non-circular cross-sectional shape. In this example, the locking pin holes 32 have an oval shape, such as to accept an oval-shaped enlarged head 36 of the illustrated locking pins 34. An oval-shaped recess, or indentation, 33 is formed in the upper and lower surfaces 27, 29 of each exemplary mat 26 around each locking pin hole 32. In this embodiment, the indentation 33 is also oval and configured to at last partially seat the oval-shaped enlarged head 36 of the illustrated locking pin 34.

Figure 4B:
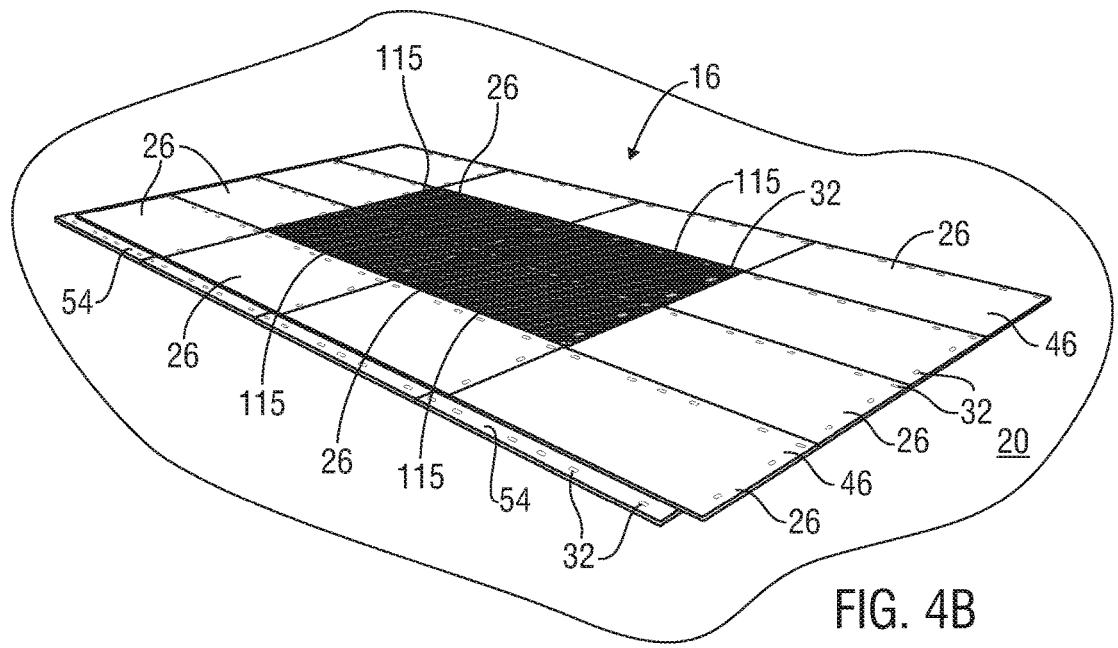
FIG. 4B is a perspective view of an exemplary support surfacing having multiple mechanically interconnected mats, some of which are equipped with an embodiment of an electrically-conductive cover and electrically coupled together.
Figure 4C:
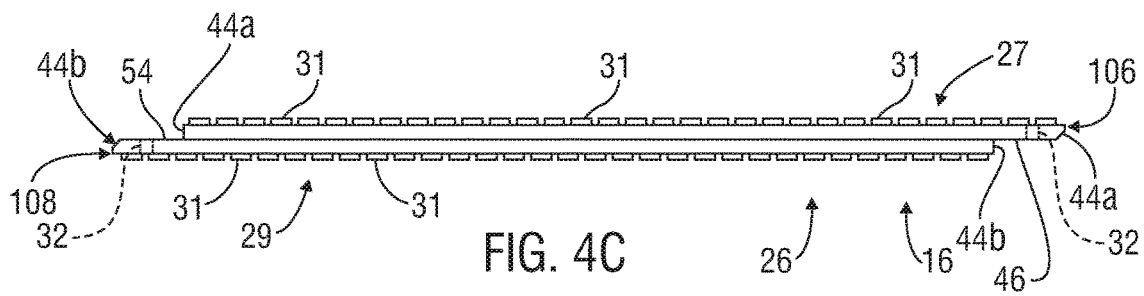
FIG. 4C is a side view of an exemplary mat.

As shown in FIG. 4C, in some embodiments, the upper and lower surfaces 27, 29 of the mat 26 may include raised traction promoting elements, or treads, 31 formed in or extending from the mat 26. However, in some stepped-configuration embodiments, the treads 31 may not be included on the underside of each panel 106, 108 of the mat 26 that extends beyond the other respective panel 106, 108. In other words, in the illustrated mat 26, the upper surface 27 of the mat 26 that forms the lower lip 54 (which is the portion of panel 108 that extends beyond panel 106) is absent the treads 31. Thus, the locking pin holes 32 on the exemplary upper lip 46 are surrounded by treads 31, while the locking pin holes 32 on the illustrated lower lip 54 are not surrounded by treads 31. Of course, when the same mat 26 is turned over, the former lower lip 54 (absent treads 31) becomes an upper lip 46 having treads 31. Some exemplary raised traction promoting elements that may be used on the mats 26 in some embodiments are shown and described in U.S. Pat. No. 6,511,257.

It should be noted, however, that the present disclosure is not limited to use with the above-described or referenced types and configurations of support surfaces 16, mats 26, locking pins 34 and holes 32, or to the disclosures of the above-referenced patents and patent applications. Any suitable support surfaces, mats and holes may be used.

Referring back to FIG. 2, in some embodiments, a gap 22 may be formed between adjacent edges 44 of adjacent interconnected mats 26 in the support surface 16, and one or more seal members 10 may be included therein. For example, the seal member(s) 10 may provide a liquid-tight seal in the gap 22 between adjacent mats 26 to prevent liquid introduced onto the support surface 16 from seeping or flowing between mats 26 and/or other components and below the support surface 16.

Some embodiments of seal members 10 that may be used in the gaps 22 are disclosed in U.S. Pat. No. 9,212,746 to McDowell, issued on Dec. 15, 2015 and entitled "Apparatus and Methods for Sealing Between Adjacent Components of a Load-Supporting Surface", U.S. patent application Ser. No. 14/948,340, filed on Nov. 22, 2015 and entitled "Method of Sealing Between Adjacent Components of a Load-Supporting Surface With at Least One Closed-Cell Compressible Rubber Seal", U.S. patent application Ser. No. 14/730,938, filed on Jun. 4, 2015 and entitled "Load-Supporting Surface with Actively Connected Gap Seals and Related Apparatus and Methods", and U.S. patent application Ser. No. 14/733,324, filed on Jun. 8, 2015 and entitled "Load-Supporting Surface with Interfacing Gap Seal Members and Related Apparatus and Methods", all of which have a common Assignee as the present patent application and the entire contents of which are hereby incorporated by reference herein in their entireties.

The support surface 16 may include or be associated with other components, and the seal member(s) 10 may also or instead be used between any combination of mats 26 and other components associated with the support surface 16. Some examples of such additional components that may be useful in connection with support surfaces 16, such as berm members, spacers, drive-over barriers, liquid drain assemblies, etc., are shown and disclosed in U.S. Pat. No. 9,039,325 and U.S. patent application Ser. No. 13/790,916.

In some instances, such as shown in FIG. 4A, the support surface 16 may be used around an underground borehole 120, such as with the use of a borehole edge seal system 110. Various embodiments of exemplary borehole edge seal systems 110 are shown and described in U.S. patent application Ser. No. 14/497,429, entitled "Apparatus and Methods for Sealing Around the Opening to an Underground Borehole" and filed on Sep. 26, 2014 and U.S. patent application Ser. No. 14/666,584 entitled "Apparatus and Methods for Mechanically Coupling a Sealing System Around the Opening to an Underground Borehole" and filed on Mar. 24, 2015, both of which have a common Assignee as the present patent application and the entire contents of which are hereby incorporated by reference herein in their entireties.

In various embodiments, such as shown in FIG. 4B, one or more electrically-conductive covers 115 may be used in connection with the support surface 16. Various embodiments of electrically-conductive covers are shown and described in U.S. patent application Ser. Nos. 14/496,105 and 14/838,064. If desired, one or more illuminators (not shown) may be used in connection with the support surface 16. Various embodiments of illuminators are shown and described in U.S. patent application Ser. No. 14/336,163.

However, it should be understood that none of the particular embodiments or features described or shown in FIGS. 1-4C, or in the above-referenced patents and patent applications, is required for, or limiting upon, the present disclosure unless and only to the extent as may be explicitly required in a particular claim hereof or in a patent claiming priority hereto and only for such claim and any claims depending therefrom.

Figure 12:
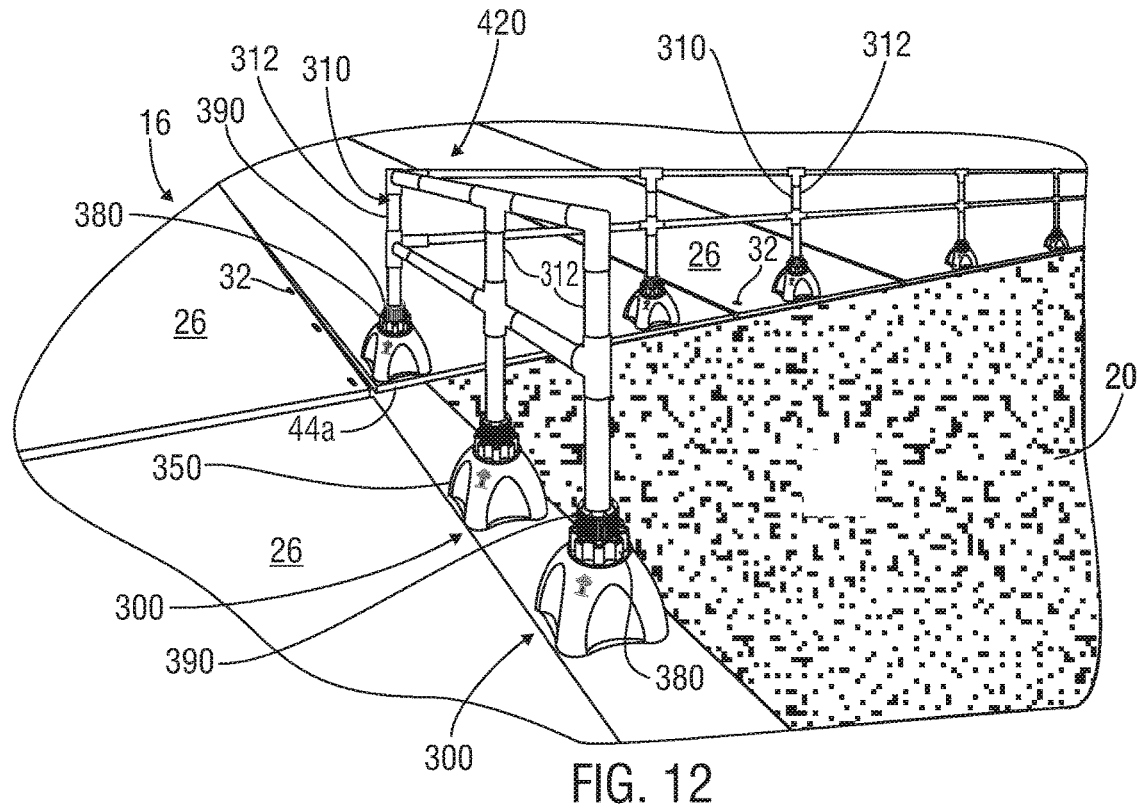
FIG. 12 is a perspective view of multiple exemplary upright member support systems shown supporting an exemplary safety barrier system in connection with an exemplary support surface in accordance with an embodiment of the present disclosure.
Figure 13:
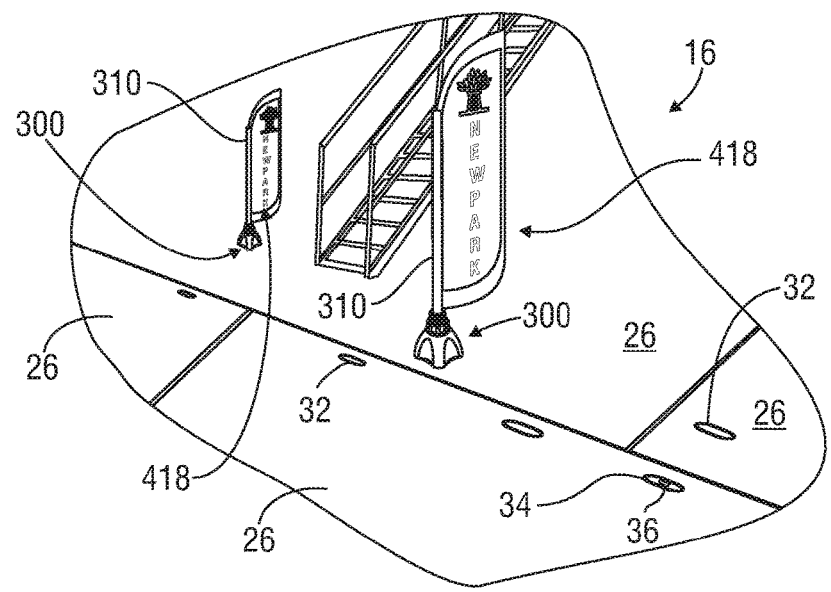
FIG. 13 is a perspective view of multiple exemplary upright member support systems shown supporting exemplary signage in connection with an exemplary support surface in accordance with an embodiment of the present disclosure

Now referring to FIGS. 5A-C, an embodiment of an upright member support system 300 for supporting at least one upright member 310 from the support surface 16 is shown. The upright member 310 with which the support system 300 may be used may have any desired components, configuration, operation and use. For example, the upright member 310 may be, or include, a bar, post, frame or the like. In this embodiment, the upright member 310 is a pole 312 useful to support one or more signs, fences or safety barriers, and may be constructed of any suitable material, such as aluminum, steel or fiberglass. In FIG. 12, for example, multiple upright member support systems 300 are shown supporting multiple poles 312 which are part of a safety barrier system 420. For another example, FIG. 13 shows multiple upright member support systems 300 each supporting an upright member 310 that carries a sign 418. However, the present disclosure is not limited to these exemplary types of upright members 310. In fact, the support system 300, present disclosure and appended claims are not intended to be limited by the type, function or any other characteristics of the upright member 310.

As shown, the exemplary support system 300 positions the upright member 310 to extend vertically upwards from the mat 26. In other embodiments, the system 300 could position the upright member 310 to extend angularly upwards from the mat 26, sideways or in another orientation. As used herein and in the appended claims, the phrases "extending from", "upright", "upwardly" and variations thereof when used in the context of the relationship of the upright member (e.g. 310) relative to the support surface (e.g. 16) means extending therefrom in any direction other than downwardly into the ground 20. Thus, the present disclosure is not limited by the particular orientation of the upright member 310 relative to the support surface 16, as long as the support system 300 supports the upright member 310 relative to the support surface 16 in a direction other than down into the ground 20.

As shown in FIG. 5B, the illustrated support system 300 includes at least one elongated carrier 320 (See also FIGS. 6A-C). As used herein, the terms "elongated" and variations thereof mean an item having an overall length that is greater than its average width. The exemplary carrier 320 engages the upright member 310 and the support surface 16, and assists in supporting the upright member 310 as it extends from the support surface 16.

The carrier 320 may have any suitable form, configuration, components, construction and operation and may engage the upright member 310 and support surface 16 in any suitable manner. In this embodiment, as shown in FIGS. 7A-E, the carrier 320 includes a threaded upper end 322, a lower end 324 and at least one longitudinally-oriented bore 326. In this example, as shown in FIG. 7A, the bore 326 extends into the carrier from one or more openings 332 formed in the upper end 322 of the carrier 320 to an internal surface 330 (e.g. FIG. 7C) located proximate to the lower end 324. In other embodiments, one or more internal surfaces 330 may be located elsewhere, angled or not included. The illustrated bore 326 is configured to (i) receive at least part of the upright member 310 which, in this embodiment, is slideable therein, and (ii) hold the upright member 310 it its desired upright position relative to the support surface 16.

As shown in FIGS. 5B and 5G, the lower end 324 of the illustrated carrier 320 is releasably engageable with the support surface 16. For example, at least part of the lower end 324 is insertable into and through at least one hole 32 of the illustrated mat 26 and releasably securable to the mat 26. In this embodiment, the lower end 324 is shown is engaged with the "locking pin" hole 32 of the upper lip 46 of the illustrated mat 26. In other embodiments, the lower end 324 may be engaged with the locking pin hole 32 of a mat's lower lip 54, a hole 32 in another part of the mat 26, or aligned holes 32 of multiple mats 26 and/or other components.

Any suitable arrangement for engaging the lower end 324 of the carrier 320 to the mat 26 may be used. Referring back to FIGS. 7A-C, for example, the lower end 324 may include a neck portion 334 that is rotatable within the hole 32 of the mat 26 (e.g. FIG. 5B), and at least one coupler 336 situated below the neck portion 334 and configured to extend through the hole 32 and engage the mat 26. The neck portion 334 and coupler 336 may have any suitable form, configuration and operation. In this example, the neck portion 334 has a cross-sectional shape (e.g. circular) so that when the neck portion is positioned in the exemplary (e.g. non-circular shaped) hole 32, the lower end 324 of the carrier 320 is freely rotatable relative to the hole 32. The exemplary coupler 336 includes at least one foot 340 having at least two protrusions, or toes, 344 extending laterally outwardly therefrom and configured to be insertable through the hole 32 of the mat 26 (or another component or multiple aligned mats and/or other components) of the support surface 16 in at least a first position of the lower end 324 of the carrier 320. When the exemplary lower end 324 is (at least partially) rotated into at least a second position, the exemplary toes 344 are configured to extend below and outwardly relative to the hole 32 of the mat 26. (See also, e.g. FIG. 5G). For example, each ninety-degree rotation of the illustrated carrier 320 moves the exemplary toes 344 between positions.

In the second, or locked, position of the lower end 324, as shown in FIG. 5G, the exemplary toes 344 are misaligned with the hole 32, preventing the lower end 324 from being removed from the hole 32 and the carrier 320 from being disengaged from the mat 26. For example, the illustrated toes 344 are shown engaging the recess 33 formed in the lower surface 29 of the mat 26 around the hole 32. (In FIGS. 6A-C, the toes 344 are also shown in the locked position relative to the mat 26.) In other embodiments, the toes 344 may engage the lower surface 29 of the mat 26 itself, another portion of the mat 26 or other component of the support surface 16 adjacent to the hole 32.

If desired, the foot 340 may be formed, configured and operate similarly as the foot (e.g. foot 66) described and illustrated in U.S. Pat. No. 9,068,584 and U.S. patent application Ser. No. 14/752,067. While the foot 66 of U.S. Pat. No. 9,068,584 and Application Ser. No. 14/752,067 is particularly described as being inserted through the connecting holes 18 of two mats 12, 14, the foot 340 of the present disclosure may be similarly inserted through one or more holes 32 of one or more mats 26 or other components. However, the lower end 324 of the carrier 320 may be secured to the mat 26, another component of the support surface 16 or a combination of multiple mats 26/other components in any other suitable manner.

Referring back to FIGS. 5A-C, the illustrated upright member support system 300 also includes at least one releasable base 350 arranged and adapted to extend at least partially around at least part of the lower end 324 of the carrier 320 and rest upon, abut or engage the support surface 16 (or any other component, intermediate surface or material disposed atop the support surface 16). If desired, the base 350 may be configured to assist in transferring load from the carrier 320 to the mat 26 and/or for any other desired purpose(s).

The base 350 may have any suitable form, configuration, components, construction and operation. Referring to FIGS. 8A-E, in this embodiment, the base 350 includes a longitudinally-oriented bore 354 extending therethrough to allow the base 350 to be slid over the top of the carrier 320 from the upper end 322 thereof and down the carrier 320 until it at least partially surrounds at least part of the lower end 324 thereof above the mat 26 (See e.g. FIGS. 5B & 6C). If desired, as shown in FIGS. 8B & C, the base 350 may include at least one longitudinally-oriented receiving slot 358 formed therein and extending at least partially along the length of, and in communication with, the bore 354. For example, when included, each exemplary slot 358 may be configured to mate with or receive at least one distinct alignment rib 338 extending outwardly from the carrier 320 along at least part of its length (e.g. FIGS. 7A-C) when the base 350 is positioned over the lower end 324 of the carrier 320. This slot 358/rib 338 arrangement may be included, for example, to assist in preventing, limiting or reducing rotation of the carrier 320 relative to the support surface 16, stabilizing the upright member support system 300 and upright member 310 or any other desired purpose. The present embodiment includes, for example, three sets of slideably mating elongated alignment ribs 338 and elongated slots 358. However, any desired number of alignment ribs 338 and receiving slots 358 may be used.

Still referring to FIG. 8A-E, the base 350 may have any suitable shape and purpose. For example, the illustrated base 350 may be configured to abut, and transfer load placed upon the carrier 320 to, the face or upper surface 27 of the mat 26 (e.g. FIGS. 5B & C) (or any other component, intermediate surface or material disposed atop the mat 16) and/or reduce the bending moment of the carrier 320. Thus in the context of the relationship of the base 350 and the mat 26, as used herein and in the appended claims the phrase "upper surface" of the mat 26 includes and encompasses the upper surface 27 of the mat 26 and any other component, material or intermediate surface disposed atop the mat 16. In this embodiment, the base 350 has a conical outer shape with four perimeter corners 360 configured to transfer and spread load from the carrier 320 to different points or areas on the upper surface 27 of the mat 26 (e.g. FIGS. 5B & C). In other embodiments, the base 350 may include two or more (e.g. three, four, five, etc.) perimeter corners 360 or have a different configuration to transfer and spread load from the carrier 320 to different points or areas on the upper surface 27 of the mat 26 and/or any other desired purpose(s).

If desired, the base 350 may include at least one gripper 366 configured to grip or engage the mat 26 or other component to prevent, limit or reduce rotation of the base 350 and carrier 320 relative to the mat 26, or one or more other desired purposes. The gripper 366 may have any suitable form, construction, components, configuration and operation. In this embodiment, the gripper 366 includes multiple spaced-apart teeth 370 protruding downwardly from the base 350 and configured to engage the mat 26. While four such teeth 370 are shown, any desired number of teeth may be included, such as two, three, four, five, six, seven, etc. For example, the teeth 370 may be positioned proximate to the bore 354 of the base 350 (e.g. FIG. 8C) so that they fit within the recess 33 (e.g. FIG. 5D) extending around the hole 32 of the mat 26. The four exemplary spaced-apart teeth 370 will seat within the oval-shaped recess 33 at different positions so that they will abut the wall of the recess 33 upon any attempted twisting or rotational motion applied to the base 350 or carrier 320, preventing, limiting or reducing actual rotation thereof. In other embodiments, any desired number of grippers 366 (e.g. one, two, three, four, five, six, etc.) may instead or also engage the upper surface 27 of the mat 26 or raised traction promoting elements (treads) 31 (e.g. FIG. 4C) formed in or extending from the upper surface 27 of the mat 26 or any other component(s).

Referring back to FIG. 5A-C, the exemplary system 300 may also include at least one releasable lock 380 configured to assist in securing the position of the base 350 and carrier 320 relative to the mat 26. The lock 380 may have any suitable form, configuration, components, construction and operation. For example, the illustrated lock 380 is generally tubular in shape and includes a threaded bore 382 (e.g. FIGS. 9A-E) configured to mate with the threaded upper end 322 (e.g. FIG. 5E) of the carrier 320. In this embodiment, after the illustrated base 350 is positioned over the lower end 324 of the carrier 320, the lock 380 is screwed down onto the carrier 320 until its lower surface 384 abuts the base 350, effectively sandwiching the base 350 against the mat 26. For example, the lock 380 may force and hold the base 350 in abutting contact with the mat 26 and assist in holding the carrier 320 in its locked position on the mat 26. In this example, as shown in FIGS. 9A-E, the body 386 of the lock 380 includes numerous at least partially hollowed spokes 388, such as for ease of gripping and rotating the lock 380, to optimize the size, weight and/or material used in manufacturing the lock 380 or other desired purposes(s). However, the spokes 388 may not be included in various embodiments.

Referring again to FIGS. 5A-C, the upright member support system 300 may also include one or more releasable upright member anchors 390 useful to help secure the position of the upright member 310 relative to the carrier 320 or other desired purpose. The upright member anchor 390 may have any suitable form, configuration, components, construction and operation. For example, the anchor 390 may include one or more ratchet-like mechanisms, wingnuts or other component(s) arranged and adapted to releasably engage the upright member 310. In some embodiments, the anchor 390 and lock 380 may be integrally formed as a single component or as interconnected components.

In this embodiment, as shown in FIG. 5E, the anchor 390 includes at least one compression member 394 and at least one compression nut 400. The compression member 394 may have any suitable form, configuration, construction and operation. The illustrated compression member 394 is a spring ring 395 configured to at least partially engage, squeeze or grip the upright member 310. The exemplary compression nut 400 is configured to bias and hold the compression member 394 in gripping engagement with the upright member 310 (e.g. above the lock 380). Any suitable arrangement may be used. In the present embodiment, as shown in FIGS. 10A-C, the body 396 of the illustrated compression member 394 is formed in an overall ring-like shape and is at least partially deformable. If desired, the compression member 394 may have one or more grip-enhancement features that encourages or enhances its ability to grip the upright member 310. For example, in the illustrated embodiment, the body 396 of the compression member 394 has a sine-wave shape. Other examples may include a series of ribs, pimples, cut-outs or rough areas formed in the outer surface of the body 396 of the compression member 394. In this embodiment, the compression member 394 is the only component of the upright member support system 300 that clamps or grips the upright member 310. However, in other embodiments, multiple components of the support system 300 may grip or clamp the upright member 310.

Referring now to FIGS. 11A-D, the compression nut 400 may likewise have any suitable form, configuration, construction and operation. It should be noted that while the term nut is used as part of the term "compression nut", this component 400 need not necessarily be a nut as that term is typically defined or known in a technical sense. Thus, the compression nut 400 is not limited to a "small flat piece of metal or other material, typically square or hexagonal, with a threaded hole through it for screwing onto a bolt as a fastener" or the like, but may take any other form suitable for the purposes described herein or as will otherwise be apparent from this specification and the appended drawings and claims.

For example, the illustrated compression nut 400 is generally tubular and includes a threaded bore 404 configured to mate with the threaded upper end 322 of the carrier 320 around the compression member 394. In this embodiment, as shown in FIG. 5E, the compression nut 400 screws onto the carrier 320 above the lock 380, and inwardly biases, or places crushing forces, upon the compression member 394. For example, the illustrated compression nut 400 may bias the compression member 394 between (i) one or more interior ledges 408 of the compression nut 400, (ii) one or more upper lips 332 of the carrier 320 and (iii) the upright member 310. In this example, the ledge 408 and lip 332 may be angled to assist in biasing and/or retaining the compression member 394 into engagement with the upright member 310. In some applications, the compression nut 400 may be threaded or moved down the carrier 320 sufficiently far to abut the lock 380.

If desired, the various components of the upright member support system 300 may be reusable and constructed of any suitable material that is sufficiently strong to bear and transfer loads placed upon the upright member 310, and sufficiently weather-resistant, wear-resistant and durable, as desired. In this embodiment, the carrier 320, base 350, lock 380 and compression nut 400 may, for example, be constructed of fiber-reinforced plastic, such as glass-filled polyurethane or glass-filled nylon. The exemplary compression member 394 may, for example, be constructed of unfilled nylon.

Now referring to FIGS. 5B, 5C & 5F, in yet another independent aspect of the present disclosure, the system 300 may include one or more directional indicators 414 configured to provide a visual indication that the lower end 324 of the carrier 320 is in locking relationship with the support surface 16. The directional indicator 414 may have any desirable form, configuration and operation. In this embodiment, the directional indicator 414 is provided on the base 350 to indicate when the coupler 336 (e.g. FIG. 5B) is in locking engagement with the mat 26. For example, the directional indicator 414 may be in the form of one or more visible arrows 416 that indicates when the toes 344 of the exemplary coupler 336 are in a locked position relative to the hole 32. In this embodiment, the carrier 320 is locked to the mat 26 when one arrow 416 points to the edge 44a of the upper lip 46 of the mat 26. In other embodiments, the arrow 416 may point to the edge 44b of a lower lip 54, or another desired part of the mat 26 or support surface 16 to indicate the carrier 320 is locked to the mat 26.

Referring to FIGS. 5A-F, in an exemplary embodiment of a method of use of the illustrated upright member support system 300, the carrier 320 may first be releasably secured to one or more mats 26 of the support surface 16. For example, the carrier 320 may be releasably secured to one or more holes 32 (e.g. locking pin hole) of one or more mats 26, such as described above. The exemplary releasable base 350 is placed over and down the carrier 320 so it covers at least part of the lower end 324 thereof and rests upon, contacts or abuts the mat 26, such as also described above. The illustrated lock 380 is engaged with (e.g. screwed onto) the carrier 320 above the base 350. If desired, the lock 380 may be tightened relative to the carrier 320 and base 350 sufficient to push or secure the base 350 into the desired contact or engagement with the mat 26. In some embodiments, the lock 380 may assist in securing the teeth 370 of the base 350 into the recess 33 of the hole 32 or otherwise grip the mat 26 or other component(s).

The exemplary upright member 310 is inserted into the bore 326 (e.g. FIG. 7A) of the exemplary carrier 320 (this can be done at any time, typically after the carrier 320 is secured to the support surface 16). In this particular embodiment, for example, the upright member 310 rests upon an internal surface 330 of the carrier 320. Before or after the upright member 310 is inserted into the illustrated carrier 320, the anchor 390 is releasably secured to the carrier 320 (e.g. above the lock 380). For example, the illustrated compression member 394 may be placed inside the compression nut 400, which is then threaded onto the carrier 320 above the lock 380. Once the upright member 310 is inserted into the exemplary carrier 320, the illustrated anchor 390 is adjusted to grip the upright member 310. For example, the compression nut 400 may be tightened onto the carrier 320 until the compression member 394 grips the upright member 310 as desired. The exemplary system 300 is reusable and may be disassembled for maintenance, reuse or repair, such as, for example, by reversing the order of some or all of the above actions.

In some embodiments, the geometry, interaction and/or engagement of the various parts of the exemplary upright member support system 300 and with respect to the upright member 310 and support surface 16 are configured to maintain the upright member 310 in the desired upright position (e.g. vertical) relative to the support surface 16 under expected operating conditions. In some cases, these conditions may include up, to or at least, approximately 200 lbs. of wind forces or other loads imparted to the upright member 310 and/or to meet current and expected OSHA load targets for leaning loads on safety barriers. For example, referring to FIGS. 5B & 5E, in the present embodiment, the upright member 310 is supported by the carrier 320 and gripped by the compression member 394 so that when the upright member 310 bends under normal or expected use conditions, it acts upon the interior wall 346 of the exemplary carrier 320. Much or all of the expected forces placed upon the illustrated carrier 320 by the bending upright member 310 are transferred to the base 350, which is configured to displace at least some, most or all of those forces to the support surface 16.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods that may be described above or claimed herein and any other methods which may fall within the scope of the appended claims can be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components. While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

The invention claimed is:

1. System for supporting at least one upright member from a support surface having a top side, a bottom side and at least one hole extending therethrough, the system comprising:
    at least one elongated carrier including upper and lower ends, said lower end of said at least one carrier including a rotatable foot insertable through and removable from the at least one hole of the support surface from above the top side of the support surface when said foot is rotated in at least a first position, said foot including at least one toe extending outwardly therefrom and releasably engageable with the bottom side of the support surface when said foot is rotated into at least a second position after being inserted through the at least one hole of the support surface to assist in securing said carrier to the support surface, said carrier also including a longitudinally-oriented bore extending at least partially therethrough, accessible at said upper end thereof and configured to receive at least part of the at least one upright member;
    at least one base arranged and adapted to extend around at least part of said lower end of said carrier and being configured to abut the top side of the support surface; and
    at least one releasable anchor at least partially, releasably, threadably engageable with said carrier and arranged and adapted to releasably grip the upright member when the upright member is inserted into said bore of said carrier.

2. The system of claim 1 wherein said lower end of said carrier includes at least one neck portion configured to rotate within the at least one hole.

3. The system of claim 2 wherein the at least one hole of the support surface has an oval shape and said neck portion of said carrier has a circular cross-sectional shape.

4. The system of claim 1 wherein said base includes a longitudinally-oriented bore extending therethrough and configured to slide over said upper end of said carrier, further wherein said base includes at least one longitudinally-oriented receiving slot extending at least partially along and in communication with said bore of said base, further wherein said carrier includes at least one longitudinally-oriented rib extending outwardly therefrom, each said slot of said base being configured to receive at least one said rib of said carrier when said base is slid over said carrier.

5. The system of claim 4 wherein said base includes at least three of said longitudinally-oriented receiving slots and said carrier includes three said longitudinally-oriented ribs, each of said slots being configured to receive one of said ribs.

6. The system of claim 1 wherein said base includes at least one tooth protruding downwardly therefrom, said tooth being configured to engage a recess formed in the support surface assist in preventing rotation of said base relative to the support surface.

7. The system of claim 1 wherein said base is shaped and configured to transfer load from said carrier to the top side of the support surface.

8. The system of claim 7 wherein said base has at least three perimeter corners, each said corner configured to transfer load from said carrier to the top side of the support surface.

9. The system of claim 1 wherein said at least one anchor includes at least one compression member at least partially engageable with the upright member when the upright member is inserted into said bore of said carrier, said compression member being arranged and adapted to grip the upright member.

10. The system of claim 1 wherein said carrier has an outside surface and at least part of said upper end of said carrier includes threads extending around said outside surface thereof, further wherein said anchor includes a nut configured to threadably engage said carrier.

11. The system of claim 10 wherein the upright member has a tubular shape and said anchor is configured to grip the upright member around the circumference of the upright member.

12. The system of claim 10 further including at least one releasable lock engageable with said carrier above said base and configured to assist in securing said base in abutting contact with the top side of the support surface.

13. The system of claim 12 wherein said lock is configured to threadably engage said carrier below said anchor.

14. The system of claim 1 further including at least one releasable lock engageable with said carrier above said base and configured to assist in securing said base in abutting contact with the top side of the support surface.

15. The system of claim 1 wherein the upright member has a lower end and said carrier includes at least one internal surface, said at least one internal surface of said carrier being configured to seat the lower end of the upright member thereupon when the upright member is positioned at least partially within said longitudinally-oriented bore of said carrier.

16. The system of claim 15 wherein said longitudinally-oriented bore has a lower end, further wherein said at least one internal surface of said at least one carrier is disposed proximate to said lower end of said longitudinally-oriented bore of said carrier.

17. A method of supporting at least one upright member from a support surface with the use of the upright member support system of claim 1, the support surface having a top side, a bottom side and at least one hole extending therethrough, the method comprising:
    positioning the rotatable foot disposed at the lower end of the elongated carrier in at least a first position;
    inserting the lower end of the carrier into the at least one hole of the support surface from above the top side of the support surface so that the foot is positioned below the bottom side of the support surface;
    rotating the foot of the carrier into at least a second position so that at least one toe extending outwardly from the foot abuts the bottom side of the support surface, positioning the base at least partially around the carrier so it at least partially covers at least part of the lower end of the carrier;
    inserting the upright member into a longitudinally-oriented bore of the carrier;
    at least partially releasably threadably engaging the anchor with the carrier; and
    the anchor releasably gripping the upright member.

18. The method of claim 17 wherein at least the upper end of the carrier is externally threaded and the base has at least one longitudinally-oriented bore extending therethrough, further including
    sliding the bore of the base over the upper end of the carrier and sliding the base down the carrier, and
    threadably engaging the anchor to the upper end of the carrier above the base.

19. The method of claim 17 further including the upright member resting upon at least one internal surface of the carrier.

20. The method of claim 17 further including when the upright member bends under normal or expected use conditions,
    the upright member imparting forces on at least one interior wall of the carrier,
    the carrier transferring at least some of the forces imparted onto it from the upright member to the base, and
    the base transferring at least some of the forces placed upon it by the carrier to the support surface.

21. System for supporting at least one upright member from a support surface having a top side, a bottom side and at least one hole extending therethrough, the system comprising:
    at least one elongated carrier including upper and lower ends, said lower end of said at least one carrier including a rotatable foot insertable through and removable from the at least one hole of the support surface from above the top side of the support surface when said foot is rotated in at least a first position, said foot including at least one toe extending outwardly therefrom and releasably engageable with the bottom side of the support surface when said foot is rotated into at least a second position after being inserted through the at least one hole of the support surface to assist in securing said carrier to the support surface, said carrier also including a longitudinally-oriented bore extending at least partially therethrough, accessible at said upper end thereof and configured to receive at least part of the at least one upright member;
    at least one base arranged and adapted to extend around at least part of said lower end of said carrier and being configured to abut the top side of the support surface; and
    at least one releasable anchor associated with said carrier and arranged and adapted to releasably grip the upright member when the upright member is inserted into said bore of said carrier said at least one anchor including at least one compression nut being engageable with said carrier.

22. The system of claim 21 wherein said compression nut has an interior ledge and said upper end of said carrier has a lip, wherein said compression member is configured to be biased between said interior ledge of said compression nut and said lip of said upper end of said carrier.

23. The system of claim 21 wherein said compression member has a ring-like shape and is at least partially deformable.

24. The system of claim 23 wherein said compression member has a sine-wave shape.

25. System for supporting at least one upright member from a support surface having a top side, bottom side and at least one hole extending therethrough, the system comprising:

- an elongated carrier including upper and lower ends, said lower end of said carrier including a rotatable foot insertable through and removable from the at least one hole of the support surface from above the top side of the support surface when said foot is rotated in at least a first position, said foot including at least one toe extending outwardly therefrom and releasably engageable with the bottom side of the support surface when said foot is rotated into at least a second position after being inserted through the at least one hole of the support surface to assist in securing said carrier to the support surface, said carrier also including a longitudinally-oriented bore extending at least partially therethrough, accessible at said upper end thereof and configured to receive at least part of the at least one upright member;
- a base configured to extend around at least part of said lower end of said carrier and abut the support surface; and
- at least one releasable lock releasably, threadably engageable with said carrier above said base and configured to assist in securing said base in abutting contact with the support surface.

26. The system of claim 25 wherein the upright member has a lower end and said carrier includes at least one internal surface, said at least one internal surface of said carrier being configured to seat the lower end of the at least one upright member thereupon when the at least one upright member is positioned at least partially within said longitudinally-oriented bore of said carrier.

* * * * *